(12) United States Patent
Troyan et al.

(10) Patent No.: US 10,372,555 B1
(45) Date of Patent: Aug. 6, 2019

(54) REVERSION OPERATIONS FOR DATA STORE COMPONENTS

(71) Applicant: Amazon Technologies, Inc., Seattle, WA (US)

(72) Inventors: Gregory Vitaly Troyan, Bainbridge Island, WA (US); Gregory Bevan McConnel, Kirkland, WA (US); Lee Kear, Seattle, WA (US); David Arthur Stanford, Jr., Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 15/197,489

(22) Filed: Jun. 29, 2016

(51) Int. Cl.
*G06F 16/27* (2019.01)
*G06F 11/14* (2006.01)

(52) U.S. Cl.
CPC ......... *G06F 11/1469* (2013.01); *G06F 16/27* (2019.01)

(58) Field of Classification Search
None
See application file for complete search history.

(56) References Cited

U.S. PATENT DOCUMENTS

| | | | | |
|---|---|---|---|---|
| 6,096,094 A * | 8/2000 | Kay | ...................... | G06F 9/4411 717/168 |
| 6,748,429 B1 * | 6/2004 | Talluri | .................. | G06F 9/5061 709/221 |
| 2003/0167380 A1 * | 9/2003 | Green | .................. | G06F 11/1446 711/136 |
| 2008/0162590 A1 * | 7/2008 | Kundu | ................. | G06F 11/1471 |
| 2008/0184068 A1 * | 7/2008 | Mogi | ................... | G06F 11/1435 714/15 |
| 2012/0084523 A1 * | 4/2012 | Littlefield | ........... | G06F 11/1469 711/162 |
| 2014/0282458 A1 * | 9/2014 | Gupta | ....................... | G06F 8/65 717/168 |
| 2016/0301751 A1 * | 10/2016 | Peelen | .................. | H04L 67/104 |

* cited by examiner

*Primary Examiner* — Uyen T Le
(74) *Attorney, Agent, or Firm* — Thorpe North & Western, LLP

(57) ABSTRACT

A technology is described for restoring a data store to an initial state. An example method may include receiving a modify command to perform a modification operation associated with a data store component managed using an instance of a data store service hosted in a computing service environment. In response, the data store component is replicated to create a data store component copy that represents an initial state of the data store component prior to performing the modification operation. The modification operation may then be executed, changing the initial state of the data store component to a transformed state. Thereafter, a restore command option to perform a reversion operation is provided that may be configured to change the data store component from the transformed state to the initial state. A restore command to perform the reversion operation may be received, and in response, the reversion operation may be executed.

20 Claims, 10 Drawing Sheets

_US 10,372,555 B1_

REVERSION OPERATIONS FOR DATA STORE COMPONENTS

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

A virtualized computing environment may be made available to a customer (e.g., an individual or business) through a service provider that provides virtualization technologies for computing resources. The customer may have a customer account with the service provider and may have a customer environment associated with the customer account. The customer may be able to create, organize, and modify the customer environment to meet the customer's needs. In particular, a customer may be able to access a managed data store service, such as an object data store, within the customer environment. The customer may use the data store to manage the customer's data in association with the customer's operations.

DETAILED DESCRIPTION

A technology is described for restoring a state of a data store component managed by a data store service hosted within a service provider environment to an initial state. A change made to a data store component may be reversed, thereby returning the state of the data store component to an initial state. Customer configurable data store components managed using a data store service may include: data containers, tables, objects, files, keys, and metadata. In a service provider environment, changes made to data store components may fall under two general categories. First are general data store operations that, for example, include: delete, get, put, copy, and move respective data store components. Second are data store operations that modify a configuration setting for a data store component that, for example, include: permission settings, encryption settings, storage class settings, policy settings, logging settings, and event settings. Occasionally, a customer may wish to revert back to a previous state of a data store component after changes have been made to the data store component.

As an example, a customer may discover that a recent change made to a configuration setting for a data container (e.g., bucket) that contains multiple objects has caused a security setting for the data container that worked properly in the previous state to stop working. This scenario may occur especially in complex computing environments where there may be many subtle dependencies or interactions that exist between various computing resources and a data store service that operates within a customer environment. In such complex computing environments, changing a data store component may cause unintended effects. Thus, the customer may wish to revert the data store component back to a previous state in order to restore previously operational functionality that was lost after a recent change was made.

Examples of the disclosed technology may allow a data store component to be reverted to a previous state or, in cases where the previous state cannot be fully restored, to be changed to a state that approximates the previous state without violating protocols or other limitations which a customer environment is subjected to by a computing service provider. In cases where a data store component cannot be completely restored to the previous state, a customer may be presented with an analysis that identifies aspects of the previous state that could not be restored by available reversion operations.

Figure 1:
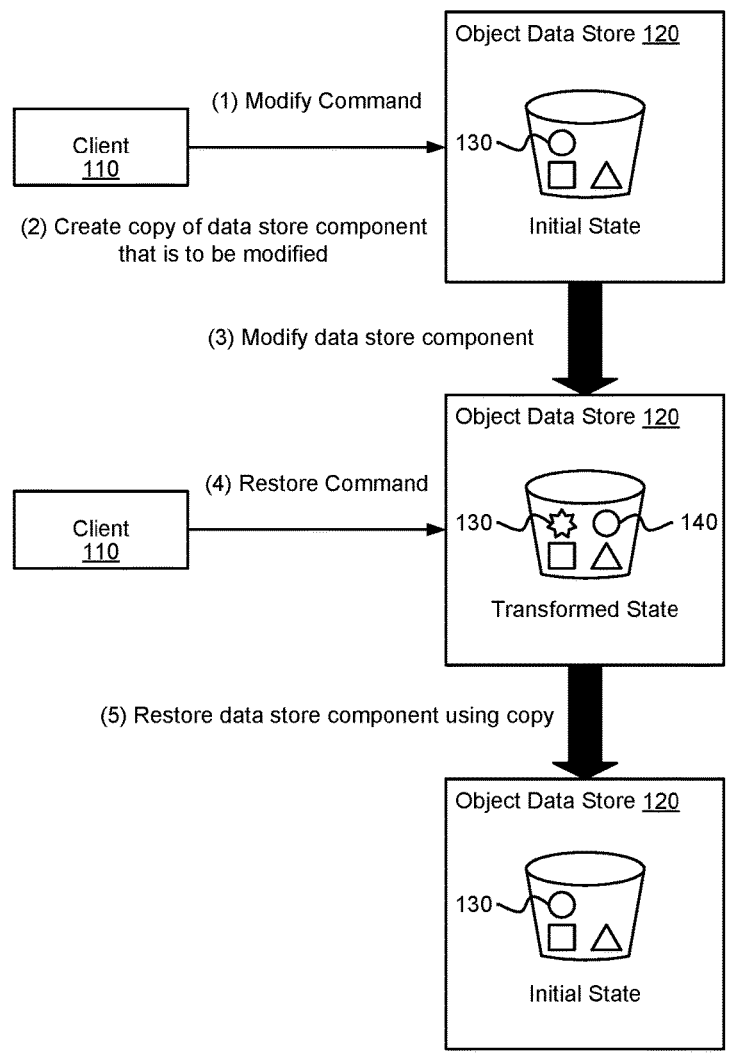
FIG. 1 is a diagram illustrating a sequence of states associated with a data store component included in an object data store that result from restore commands received by a client in accordance with one example.

FIG. 1 is a diagram illustrating a sequence of states associated with a data store component 130 included in an object data store 120 that result from modifying the data store component 130 and restoring the data store component 130 in accordance with one example of the technology. The object data store 120 may be a managed service provided by a computing service provider to customers. A customer may launch an instance of the object data store 120 in a customer environment and access the object data store 120 using an API (Application Program Interface) to store and retrieve data. Alternatively, the object data store 120 may be a service that is highly available and is managed by the service provider. Data may be stored in the object data store 120 as discrete units of storage called objects, which may be addressed and manipulated using keys (i.e., assigned unique identifiers). Objects may be placed in a data container (e.g., a bucket or storage pool), such that the objects exist at the same level in a flat address space. Configuration metadata may be assigned to the data containers and objects and configuration settings included in the configuration metadata may be configurable by a customer.

The data store components described above (i.e., data containers, objects, keys, and metadata) may be configurable by a customer using a data store operation that creates, updates, or deletes a data store component. For example, a customer may create, modify, or delete a data container, object, key, or metadata using a data store operation (e.g., PUT, POST, or DELETE). As a result, the state of the data store component being operated upon by a data store operation may be changed. The present technology provides a customer with the ability to restore a data store component to an initial state by executing a restore command.

FIG. 1 illustrates a high level example for preserving an initial state of a data store component 130 and restoring the data store component 130 to the initial state. As illustrated, a modify command may be received from a client 110. The modify command may instruct the object data store to modify a data store component 130. Prior to modifying the data store component 130, a data store component copy 140 may be created and the data store component copy 140 may be stored in the object data store 120. A data store component copy 140 may be a copy of an entire data store component 130, or a data store component copy 140 may be a copy of a portion of the data store component 130 that captures a difference or change (Delta) between an initial state and a transformed state of the data store component 130. After the data store component copy 140 has been created, the data store component 130 may be modified as instructed by the modify command, changing the state of the data store component 130 from an initial state to a transformed state. In the event that a restore command is received from the client 110, the data store component copy 140 may be identified. In addition, the data store component 130 modified by the modify command may be replaced with the data store component copy 140, thereby changing the state of the data store component 130 back to the initial state. More specific examples that provide details for restoring various data store components are described below.

Figure 2:
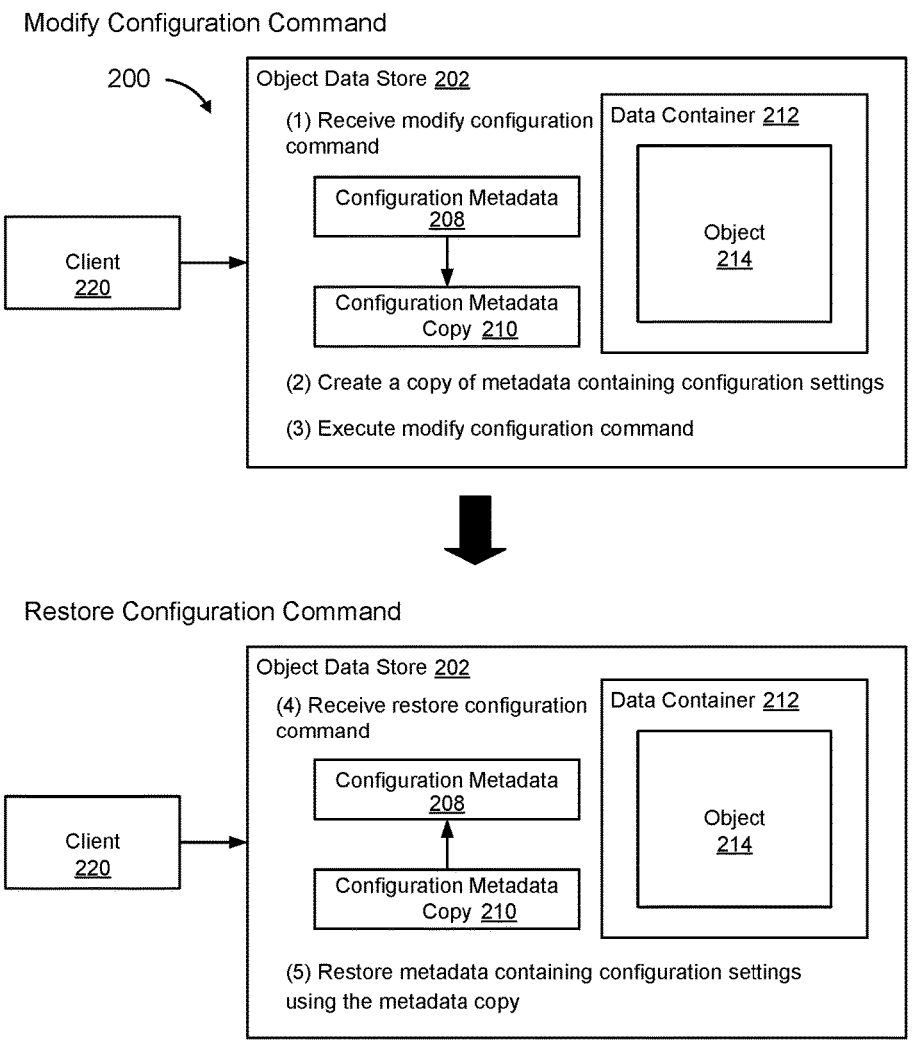
FIG. 2 is a diagram that illustrates an example system and method for restoring configuration metadata associated with a data store component to an initial state.

FIG. 2 is a diagram that illustrates an example system 200 and method for restoring configuration metadata 208 associated with a data store component to an initial state in accordance with an example of a data store operation that modifies a configuration setting for a data store component. As illustrated, the system 200 may include an object data store 202 that may be accessible to one or more clients 220. The object data store 202 may include configuration metadata 208 that may be associated with either of a data container 212 or an object 214. The configuration metadata 208 may include configuration settings for the data container 212 or the object 214. For example, configuration metadata 208 associated with a data container 212 may include configuration settings that may include: access permissions, data container policies, logging settings, and event settings. Updating a configuration of the data container 212 may call for updating the configuration metadata 208 for the data container 212. Configuration metadata 208 for an object 214 may include configuration settings that include: access permissions, data encryption settings, storage class settings (e.g., frequently accessed storage, infrequently accessed storage, archived storage, as well as other types of storage class), and customer defined metadata. Updating a configuration of the object 214 may call for updating the configuration metadata 208 for the object 214. As a specific example, a customer may update access permissions for a data container 212 or an object 214 by executing an update command that updates the access permissions stored in the configuration metadata 208 linked to the data container 212 or the object 214.

As illustrated in FIG. 2, a modify configuration command sent by a client 220 to the object data store 202 may cause configuration metadata 208 containing configuration settings for a data container 212 or an object 214 to be replicated prior to modifying any of the configuration settings contained in the configuration metadata 208, thereby preserving the state of the configuration settings in a configuration metadata copy 210, which can be used to restore the configuration settings in the event that a restore configuration command is received. For example, a modify configuration command may be received at the object data store 202 instructing the object data store 202 to modify a configuration setting associated with a data container 212 or an object 214. Prior to executing the modify command, the configuration metadata 208 associated with the data container 212 or object 214 that contains the configuration setting that is to be modified may be replicated, creating a configuration metadata copy 210.

Because configuration settings may be stored in the configuration metadata 208 linked to the data container 212 or the object 214, updating a configuration setting for the data container 212 or the object 214 may not result in modifying the data container 212 or the object themselves. As such, it may be sufficient to replicate the configuration metadata 208 in order to preserve the initial state of the configuration setting being changed.

The configuration metadata copy 210 created in response to the modify configuration command may be stored in the object data store 202. The configuration metadata copy 210 may be stored for a time period (e.g., a few hours, days, or weeks) that allows the reversion operation to be performed and may be deleted after the time period expires. In one example, a version identifier may be assigned to the configuration metadata copy 210. For example, a timestamp may be assigned to a configuration metadata copy 210 or some other value indicating a version sequence. The version identifier may be used to identify the configuration metadata copy 210. Accordingly, multiple versions of configuration metadata copies 210 may be created as a result of a sequence of modify configuration commands being received from the client 220. In one example, a restore point log containing restore points associated with modification operations performed on the configuration metadata 208 may be updated with a version identifier associated with the configuration metadata copy 210, thereby creating a restore point that the configuration metadata 208 can be restored to.

In one example, a number of configuration metadata copies 210 created in response to receiving multiple modify configuration commands may be limited to a restore buffer size limit. The restore buffer limit may act as a constraint on a number of restore configuration commands that a customer can execute by deleting an old configuration metadata copy when a new configuration metadata copy is created.

As illustrated in FIG. 2, after a configuration metadata copy 210 has been created, the modify configuration command may be executed, resulting in modifying one or more configuration settings included in the configuration metadata 208 as instructed by the client 220. A modification made to a configuration setting of a data container 212 or an object 214 may be reversed by restoring the configuration metadata 208 to an initial state using the configuration metadata copy 210. In one example, after the customer executes the modify configuration command via the client 220, the customer may be presented with a restore command option (e.g., via a graphical console interface) that allows the customer to request the execution of a reversion operation that returns the configuration metadata 208 to an initial state. In another example, the restore command option may be made available via a restore command API request that the customer may execute via the client 220, which causes the reversion operation to be executed.

The reversion operation may be configured to change the configuration metadata 208 from a transformed state to an initial state. For example, the reversion operation may replace the configuration metadata 210 associated with the data container 212 or object 214 with the configuration metadata copy 210, thereby restoring the configuration metadata 208 to an initial state. As a specific example, a modify configuration command that modifies a data container policy to restrict access to a specific IP (Internet Protocol) address set may be received from a client 220. Prior to updating the data container policy, the configuration metadata 208 that includes the data container policy may be replicated creating a configuration metadata copy 210, after which, the data container policy may be updated in the configuration metadata 208. In changing the data container policy, a customer may determine that the policy change has had a detrimental effect on the customer's operations. In response, the customer may reverse the policy change by executing the restore command, wherein the configuration metadata 208 may be restored to an initial state using the configuration metadata copy 210 such that the data container policy may be restored to allow access to the specific IP address.

A request from the client 220 to perform the reversion operation may include a version identifier associated with a configuration metadata copy 210. The version identifier may be used to identify the configuration metadata copy 210 and the configuration metadata 208 may be restored using the configuration metadata copy 210 identified by the version identifier. In one example, a customer may select a restore point to restore the configuration settings of a data container 212 or object 214 to an initial state. The restore point may be associated with a version of a configuration metadata copy 210. For example, a customer may be presented with one or more restore points associated with version identifiers for configuration metadata copies 210 and the customer may select a restore point from the restore points. Illustratively, a customer may be presented with a listing of restore points, such as timestamps or versions that correspond to versions of configuration metadata copies 210. The listing of restore points may be presented to a customer by way of a client 220 in response to a restore configuration command received at the object data store 202, or a customer may request a listing of available restore points prior to submitting a restore configuration command to the object data store 202.

In an alternative example, a restore log may be used to track changes that are made to configuration settings included in the configuration metadata 208 and the restore log may be analyzed in response to a restore configuration command to determine what changes to make or may be made to the configuration metadata 208 in order to restore the configuration metadata 208 to an initial state. As an illustration, a modify configuration command that enables encryption of an object 214 may cause a log entry that indicates that encryption has been enabled to be added to the restore log. In response to a restore configuration command, the restore log may be analyzed to determine that encryption was enabled, whereupon, encryption may be disabled, restoring the configuration settings for the object 214 to the initial state.

Figure 3:
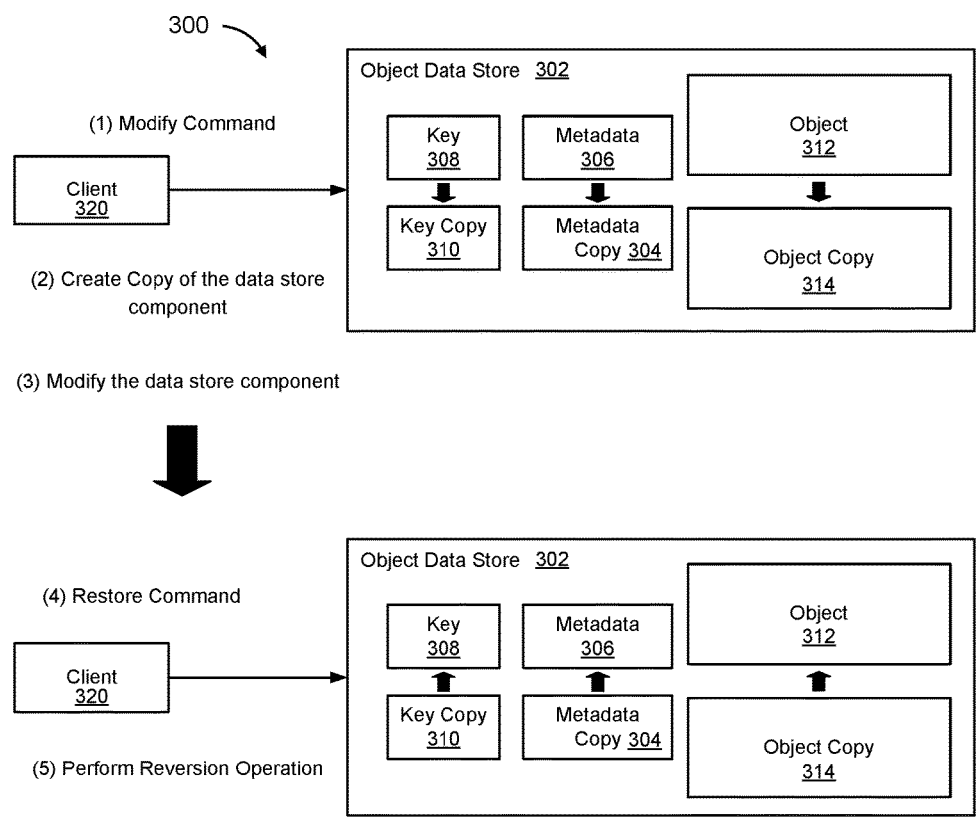
FIG. 3 is a diagram illustrating an example system and method for restoring a data store component to an initial state.

FIG. 3 is a diagram illustrating an example system 300 and method for restoring a data store component to an initial state in accordance with an example of a data store operation that deletes, puts, copies, moves, or uploads a respective data store component (e.g., a data container, an object, a key, and/or metadata). For example, a data store operation may result in: a key used to retrieve an object to be changed or replaced with a new key, metadata associated with a data container or object to be modified, an object to be removed or added to a data container, or an object to be overwritten or deleted. A customer may want to reverse a change made to a data store component by restoring the data store component to an initial state.

The example illustrated in FIG. 3 shows that in response to a modify command received from a client 320 that modifies an object 312, an object copy 314 may be created. The object 312 may include customer data that is modified by a modification operation or the object itself may be modified by the modification operation (e.g., moved or deleted). In addition to creating the object copy 314, a key 308 and metadata 306 associated with the object 312 may be replicated creating a key copy 310 and a metadata copy 304. Replicating the object 312 and the object's key 308 and metadata 306 preserves the prior state of the object 312 so that the object 312 can be restored should a customer decide to do so. For instance, deleting the object 312 may result in deleting the key 308 and metadata 306 associated with the object 312. Therefore, prior to deleting the object 312 and associated key 308 and metadata 306, an object copy 314, a key copy 310, and a metadata copy 304 may be created. After creating the object copy 314, key copy 310, and metadata copy 304, the object 312 may be modified according to the modify command.

Sometime later, the client 320 may send a restore command to the object data store 302 requesting that the object 312 be restored. In response, the object 312 may be restored using the object copy 314 and the key 308 and metadata 306 may be restored using the key copy 310 and the metadata copy 304. In some cases multiple versions of an object copy 314, key copy 310, and metadata copy 304 may be created in response to successive modify commands. In such a case, a restore command may specify a version of the object 312 to restore.

As another illustration, a data container (not shown) may be modified in response to a modify command and as part of the modification operation, a data container copy that includes configuration information associated with the data container may be created and assigned a version identifier. As an example, a modify command may delete a data container and one or more objects included in the data container. In response to the modify command, copies of the one or more objects along with keys and metadata associated with the objects and data container may be created and may be stored in the object data store. A data container copy that includes configuration information (e.g., information about the objects included in the data container) may be created. Further, indexing information that includes a data container name associated with the data container may be preserved for a time period (e.g., a few days, weeks or months), allowing for the data container name to be reassigned to the data container as part of a reversion operation that restores the data container. The original data container and objects may then be deleted. In the event that a restore command is received requesting that the data container and objects be restored, the data container may be recreated using the data container copy and the indexing information preserved for the data container, and the objects in the data container may be restored using the object copies, and the keys and metadata for the objects and the data container may then be restored using the keys and metadata copies.

As yet another illustration, a modify command may be received that modifies or deletes a key and/or metadata. In response to the modify command, a key and/or metadata copy may be created, whereupon the key and/or metadata may be modified or deleted. Should a restore command be received that requests that the key and/or metadata be restored, the key and/or metadata copy may be used to restore the key and/or metadata to an initial state.

Figure 4:
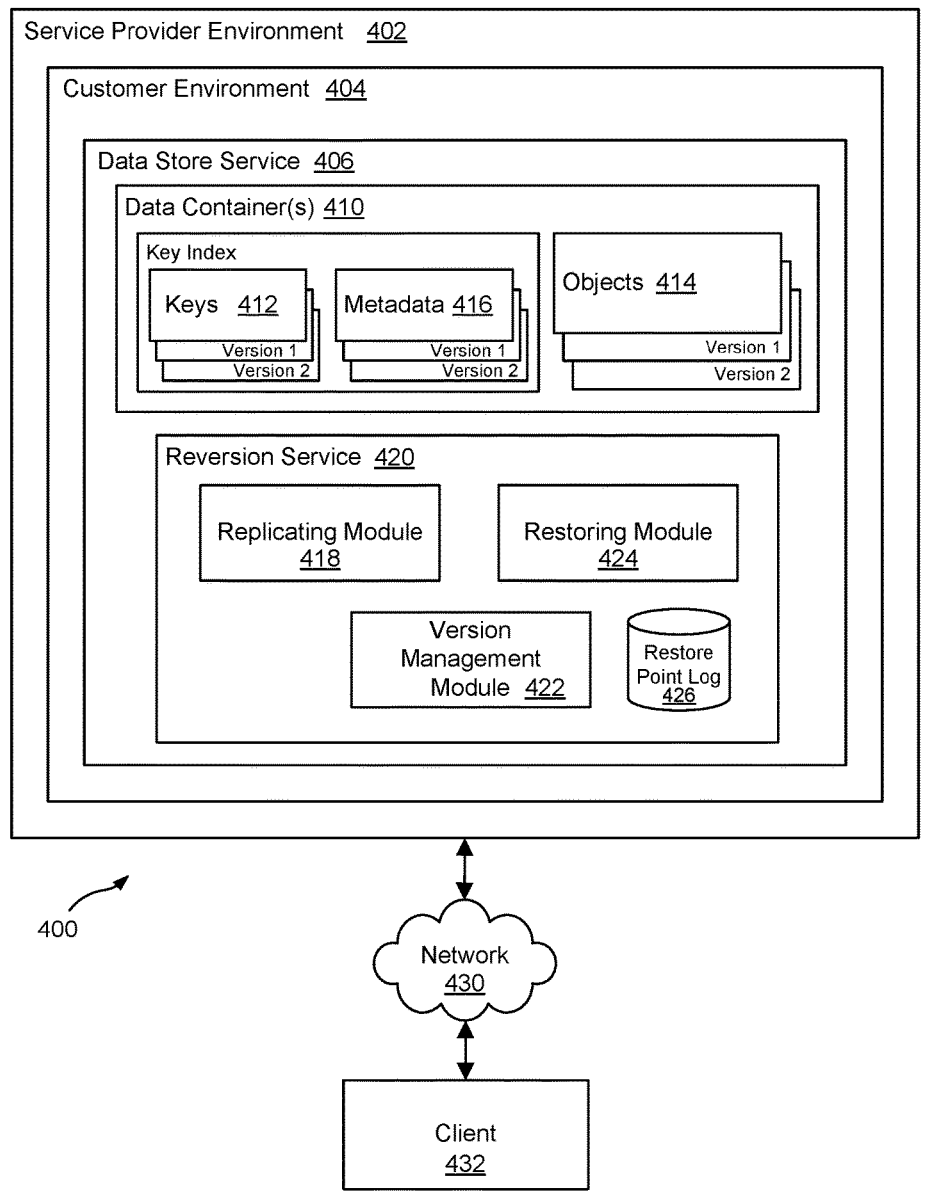
FIG. 4 is a block diagram that illustrates various example components included in a system for restoring a data store component to an initial state using a reversion service.

FIG. 4 illustrates components of an example system environment 400 on which the present technology may be executed. The system environment 400 may include a service provider environment 402 (e.g., a cloud environment) operated by a service provider. The service provider environment 402 may include servers for executing computing instances (e.g., virtual machines) using an instance manager and network devices for communication between clients 432 and the computing instances as described in greater detail below in association with FIG. 5.

The service provider environment 402 may host a customer environment 404 that may be associated with a customer account. A customer of a service provider may launch instances of virtualized computing resources and services that execute on computing instances within the customer environment 404. A client 432 may access the virtualized computing resources and services included in the customer environment 404 through a network 430. As illustrated, the customer environment 404 may include a data store service 406 or access to a protected portion of the data store service 406. A customer may utilize the data store service 406 as part of the customer's operations.

The data store service 406 may include a reversion service 420 configured to perform a reversion operation that restores a data store component that has been modified to an initial state in response to a request received from a client 432. In one example, the reversion service 420 may include a replicating module 418, a restoring module 424, and a version management module 422. The replicating module 418 may be configured to create a copy of data store components (e.g., a key 412, metadata 416, data container 410, object 414, etc.) in response to a modify command that changes the state of the data store component from an initial state to a transformed state. The replicating module 418 may include logic for replicating data store components in response to various data store operations (e.g., PUT, POST, DELETE, etc.) performed by the data store service 406 that modifies the data store components. In one example, the replicating module 418 may include logic used to determine which data store components to replicate based in part on the data store operation. For example, overwriting an object 414 may change the state of the object 414, but the states of a key 412 and metadata 416 associated with the object 414 may not be changed. Therefore, logic associated with a data store operation that overwrites the object 414 may include instructions that replicate the object 414, but not the key 412 and metadata 416. Moreover, deleting an object 414 may result in deleting a key 412 and metadata 416 associated with the object 414. As such, logic associated with a data store operation that deletes an object 414 may include instructions that replicates the object 414, as well as a key 412 and metadata 416 associated with the object 414.

The replicating module 418 may be further configured to perform versioning for data store components that are replicated in response to data store operations that modify or delete the data store components. For example, in replicating a data store component, a version identifier may be generated and the version identifier may be assigned to the data store component. The version identifier can be used to preserve, retrieve, and restore the data store component in the event that a request to perform a reversion operation is received from the client 432.

The restoring module 424 may be configured to restore a data store component to an initial state in response to a request to perform a reversion operation. In one example, a restore command may be received from a client 432 requesting that a reversion operation be performed. The restore command may be submitted to the reversion service 420 by a client 432 using an API request or a command console interface. The reversion operation may reverse a change that has been made to a data store component by restoring an initial state of the data store component using a version of a data store component copy.

In one example, a restore command may include information about a data store component that a customer would like restored to an initial state and a restore point to which the customer would like the data store component to be restored to. For example, a restore command may include an identifier for a data store component (e.g., object key, container key, a data container name or an object name) and a restore point (e.g., a version identifier or a timestamp). For instance, a restore command may resemble "restore: object=photo.gif, version ID=123".

In another example, a restore command may indicate a particular data store operation that is to be reversed, such as a change to a configuration setting, an update to a data store component, or a deletion of a data store component. For instance, a restore command may resemble "restore: data_container=photo_bucket, reverse_operation=permission update". In yet another example, a restore command may request that a data store component be restored to the previous (last) version of the data store component.

In another example, a data store component that has been restored to an initial state may be returned to a transformed state in response to a command. As an illustration, a modify command may change the state of a data store component from an initial state to a transformed state. Receiving a restore command may restore the data store component back to the initial state. Thereafter, a subsequent restore command may result in modifying the data store component as specified in the modify command, thereby returning the data store component to the transformed state. In one example, prior to restoring a data store component to an initial state in response to a restore command, a data store component copy representing a transformed state of the data store component may be created and may be used to restore the data store component to the transformed state in the event that a command to do so is received. In yet another example, a data store operation used to change a data store component to a transformed state may be preserved (e.g., via logging), and the data store operation may be executed in the event that a command requesting that the data store component be returned to the transformed state is received.

Whether a reversion operation can be performed may depend on an amount of time that has passed since a change was made to the data store component associated with the reversion operation. For example, a version of a data store component copy may be retained for a predefined amount of time (e.g., a day or a week), after which the version of the data store component copy may be deleted. Accordingly, if a retention period for a data store component copy has expired, the data store component copy may be deleted and the reversion operation cannot be performed.

In some cases, the initial state of a data store component may not be fully restored. As such, the current state of the data store component may be changed to a state that approximates the initial state of the data store component without violating protocols or other limitations to which the customer environment 404 may be subjected to by a service provider. In cases where a data store component cannot be completely restored to an initial state, a customer can be presented with an analysis that identifies aspects of the initial state that could not be restored by available reversion operations.

In some examples, a client 432 may be provided with a listing of restore points that are available to restore a data store component to an initial state. In one example, a restore point log 426 may be used to manage restore points. Illustratively, the listing of restore points may include version identifiers for data store component copies that have been created in response to modify commands executed against a respective data store component, or the listing may include timestamps associated with versions of data store component copies, or the listing may include log entries of data store operations that have been executed against the data store component. A listing of restore points may be provided as part of providing a restore command option, or a client 432 may request the listing of restore points from the reversion service 420 via an API request or through a command console interface. A restore point included in the listing of restore points may be selected and the restore point may be included in a restore command submitted to the reversion service 420.

After receiving a restore command, the restoring module 424 may be configured to identify a data store component and a data store component copy version specified in the restore command. The data store component may be replaced with the data store component copy by overwriting the data store component with the data store component copy, or by deleting the data store component and renaming the data store component copy to the name of the deleted data store component. As an illustration, a reversion operation to restore a configuration setting may include identifying metadata 416 that includes the configuration setting and a version of a metadata copy that includes the initial state of the configuration setting. The metadata 416 may then be replaced with the version of the metadata copy, thereby restoring the configuration setting to the initial state.

The version management module 422 may be configured to manage versions of data store component copies created in response to modify commands. The version management module 422 may be used to execute a retention policy for data store component copies that deletes the data store component copies after a period of time. Also, the version management module 422 may be used to perform clean up functions associated with restoring a data store component to an initial state, such as deleting a data store component version used to restore a data store component.

In one example, the version management module 422 may be configured to manage a restore buffer for various data store components. For example, changes made to a data store component that can be reversed may be limited to a restore buffer limit that limits a number of data store component copies that can be stored. When the restore buffer limit is reached, older data store component versions may be deleted so that additional versions of the data store component can be created. For example, the version management module 422 may be configured to monitor a restore buffer for a data store component and determine when a restore buffer limit has been exceeded. In determining that a restore buffer limit has been exceeded, a data store component version having an earliest time stamp may be identified and deleted. As a specific example, deleting a data container 410 that contains a large number of objects 414 (e.g., hundreds, thousands, millions, or more objects 414) may result in exceeding a restore buffer limit for the objects 414 included in the data container 410. In some examples, a notification that a data store operation will result in exceeding a restore buffer limit may be sent to a client 432 prior to executing the data store operation, thereby alerting a customer that the data store operation may not be fully reversed should the customer want to reverse the data store operation.

A client 432 may include a client device or a client service that is in communication with the service provider environment 402. A customer may utilize a client 432 to make data store operation requests and reversion operation requests to the data store service. The various processes and/or other functionality contained within the system environment 400 may be executed on one or more processors that are in communication with one or more memory modules. The system environment 400 may include a number of computing devices that are arranged, for example, in one or more server banks or computer banks or other arrangements. The computing devices may support the service provider environment 402 using hypervisors, virtual machine monitors (VMMs) and other virtualization software.

The data store service 406 may manage one or more data stores. The term "data store" may refer to any device or combination of devices capable of storing, accessing, organizing and/or retrieving data, which may include any combination and number of data servers, key value data stores, NoSQL data stores, object oriented databases, cluster storage systems, object storage systems, data storage devices, data warehouses, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 402 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 430 may include any computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 4 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 4 illustrates an example of a system that may implement the techniques above, many other similar or different environments are possible. The example environments discussed and illustrated above are merely representative and not limiting.

Figure 5:
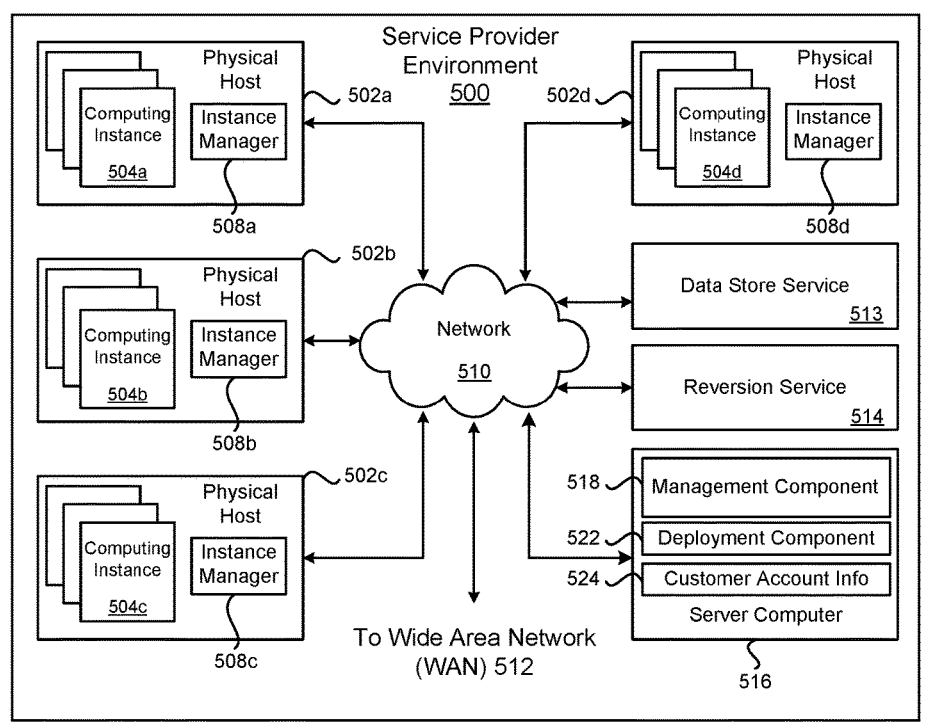
FIG. 5 is a block diagram that illustrates an example computing service environment that includes a reversion service.

FIG. 5 is a block diagram illustrating an example service provider environment 500 that may be used to execute and manage a number of computing instances 504a-d. In particular, the service provider environment 500 depicted illustrates one environment in which the technology described herein may be used. The service provider environment 500 may be one type of environment that includes various virtualized service resources that may be used, for instance, to host computing instances 504a-d.

The service provider environment 500 may be capable of delivery of computing, storage and networking capacity as a software service to a community of end recipients. In one example, the service provider environment 500 may be established for an organization by or on behalf of the organization. That is, the service provider environment 500 may offer a "private cloud environment." In another example, the service provider environment 500 may support a multi-tenant environment, wherein a plurality of customers may operate independently (i.e., a public cloud environment). Generally speaking, the service provider environment 500 may provide the following models: Infrastructure as a Service ("IaaS"), Platform as a Service ("PaaS"), and/or Software as a Service ("SaaS"). Other models may be provided. For the IaaS model, the service provider environment 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 500. End customers may access the service provider environment 500 using networked client devices, such as desktop computers, laptops, tablets, smartphones, etc. running web browsers or other lightweight client applications, for example. Those familiar with the art will recognize that the service provider environment 500 may be described as a "cloud" environment.

The particularly illustrated service provider environment 500 may include a plurality of server computers 502a-d. While four server computers are shown, any number may be used, and large data centers may include thousands of server computers. The service provider environment 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

One or more server computers 513, 514 and, 516 may be reserved to execute software components for managing the operation of the service provider environment 500 and the computing instances 504a-d. For example, a server computer 513 may execute a data store service and a server computer 514 may execute a reversion service configured to perform a reversion operation that restores a modified data store component managed by the data store service to an initial state in response to a request received from a service provider customer.

A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache should be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the service provider environment 500 and the server computers 502a-d,

516. The network 510 may be a local area network (LAN) and may be connected to a Wide Area Network (WAN) 512 or the Internet, so that end customers may access the service provider environment 500. The network topology illustrated in FIG. 5 has been simplified, many more networks and networking devices may be utilized to interconnect the various computing systems disclosed herein.

Figure 6:
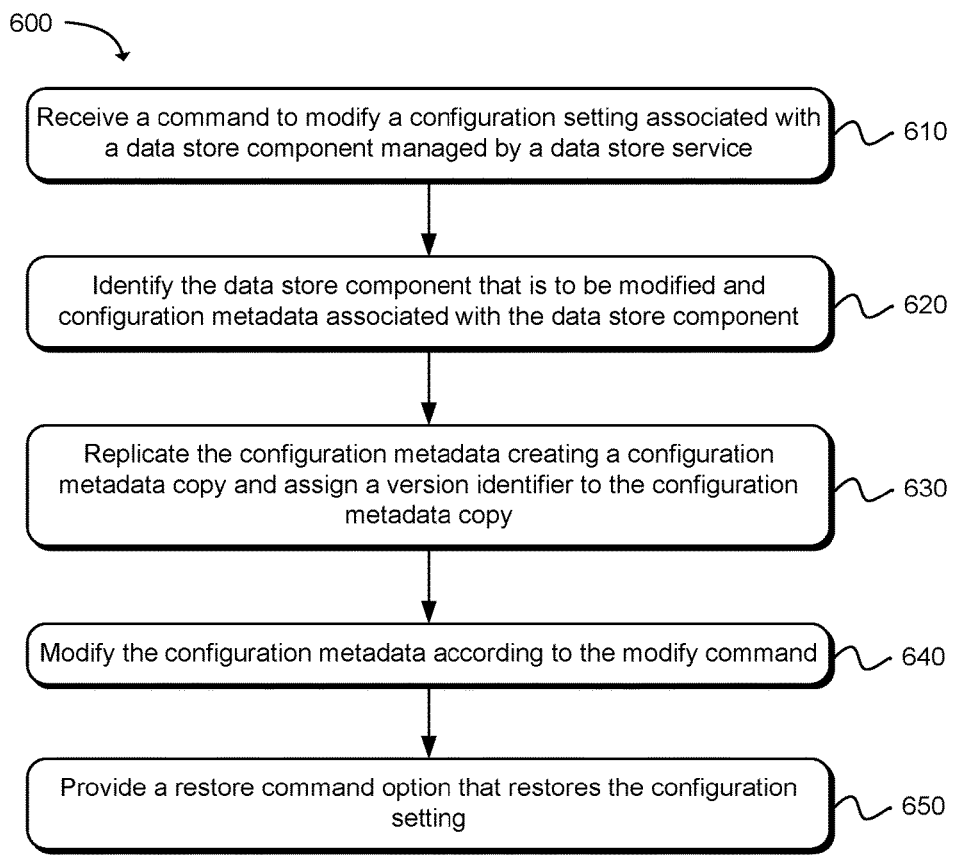
FIG. 6 is a flow diagram illustrating an example method for preserving an initial state of a data store component in response to receiving a modify command that changes a configuration setting of the data store component.

Moving now to FIG. 6, a flow diagram illustrates an example method 600 for preserving an initial state of a data store component (e.g., a data container or object) in response to receiving a modify command that changes a configuration setting of the data store component. Preserving the initial state of the data store component may allow changes made to the configuration setting to be reversed should a customer make a request to do so. Examples of configuration settings for data store components that may be reversed using a reversion operation may include: permission settings, encryption settings, storage class settings, user metadata, policy settings, logging settings, event settings, as well as other configuration settings.

As in block 610, a command to modify a configuration setting associated with a data store component managed by a data store service may be received at a data store service hosted within a customer environment (e.g., a cloud environment) provided by a computing service provider. The command may be for a data store operation that modifies the configuration setting of the data store component. In response to receiving the modify command, and prior to updating the configuration setting as instructed by the modify command, the data store component may be identified along with the configuration metadata associated with the data store component, as in block 620.

After the configuration metadata associated with the data store component has been identified, as in block 630, the configuration metadata may be replicated, creating a configuration metadata copy that contains the initial state of the configuration setting prior to a modification being made to the configuration setting. A version identifier may be generated and the version identifier may be assigned to the configuration metadata copy. As such, multiple versions of the configuration metadata may be created, resulting in multiple restore points that may be available for restoring the configuration metadata. For example, a configuration metadata copy may be created and assigned a version identifier whenever a configuration setting included in the configuration metadata copy is modified. When restoring a configuration setting, a customer may select a version of a configuration metadata copy to use to restore the configuration setting.

Having replicated the configuration metadata that includes the configuration setting resulting in preserving the initial state of the configuration setting in the configuration metadata copy, the configuration metadata may be modified according to the modify command received from the client, as in block 640, changing the state of the configuration setting from the initial state to a transformed state.

As in block 650, a restore command option may be provided that allows a customer to restore the configuration setting of the data store component to the initial state. In one example, the restore command option may be associated with a restore time period during which the restore command option is available. The restore time period may limit how long a restore command option is available as determined by a computing service provider. A restore time period may be as little as a few minutes to as long as a few days, weeks, or months. Moreover, a restore time period may be determined based in part on the impact of the modify command being performed. For example, a restore time period associated with reversing a modify command that impacts a single data store component may be longer as compared to a restore time period associated with reversing a modify command that impacts hundreds or thousands of data store components. In one example, a customer may be notified how long a restore command option is available as part of providing the restore command option.

Figure 7:
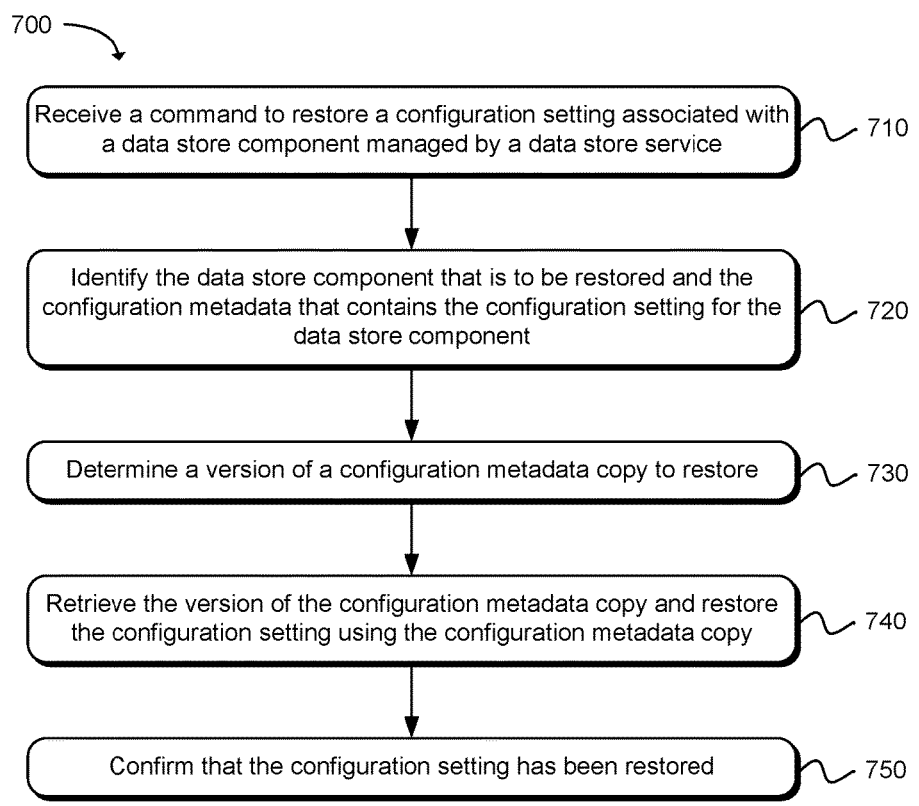
FIG. 7 is a flow diagram that illustrates an example method for restoring a state of a data store component to an initial state in response to receiving a request to perform a reversion operation.

FIG. 7 is a flow diagram illustrating an example method 700 for restoring a state of a data store component to an initial state in response to receiving a request to perform a reversion operation at a data store service. As in block 710, a restore command may be received at a data store service requesting that a configuration setting associated with a data store component managed by the data store service be restored to an initial state. As described above in association with FIG. 6, a restore command option that restores a configuration setting associated with a data store component may be provided to a customer after the configuration setting has been modified. Sometime after the configuration setting has been modified, the customer may execute the restore command option, resulting in a request to perform a reversion operation that restores the configuration setting to a previous value.

The restore command may include information about a configuration setting for the data store component that the customer would like restored to an initial state. Using the information included in the restore command, the data store component may be identified and configuration metadata containing the configuration setting for the data store component may be identified, as in block 720. Also, the restore command may include a restore point to which the customer would like the configuration setting to be restored to. For example, the restore command may include a version identifier assigned to the configuration metadata copy, a restore point identifier, or another type of identifying information may be used to identify the configuration metadata copy. Using the restore point included in the restore command, a version of a configuration metadata copy that is to be used to restore the configuration setting to the initial state may be identified, as in block 730.

In one example, a determination may be made whether a reversion of a configuration setting may be fully reversed. For example, some configuration setting may not be disabled once enabled, but may be suspended. For example, enabling versioning for a data container may not be disabled once versioning has been turned on. As a result, reversing versioning may result in suspending versioning, but may not result in disabling versioning for the data container. Thus, in one example, a customer may be provided with reversion-limitation information that identifies aspects of a modification operation that cannot be undone by a reversion operation when executing a reversion operation. In some examples, a customer may be provided with an estimate time frame for performing the reversion operation. For example, in a case where a reversion operation may involve a substantial number of data store operations to complete the reversion operation, a time estimate for performing the data store operations may be calculated and provided to a customer.

Having identified a version of the configuration metadata copy, as in block 740, the version of the configuration metadata copy may be retrieved, and the configuration setting may be restored using the configuration metadata copy. In one example, a key index that includes a key and the configuration metadata that is associated with the data store component may be updated with the configuration metadata copy. In updating the configuration metadata with the configuration metadata copy, the configuration setting included in the configuration metadata may be restored to the state of the configuration setting included in the configuration metadata copy. As in block 750, after the configuration setting has been restored to the initial state, a confirmation that the configuration setting has been restored may be provided to the customer.

Figure 8:
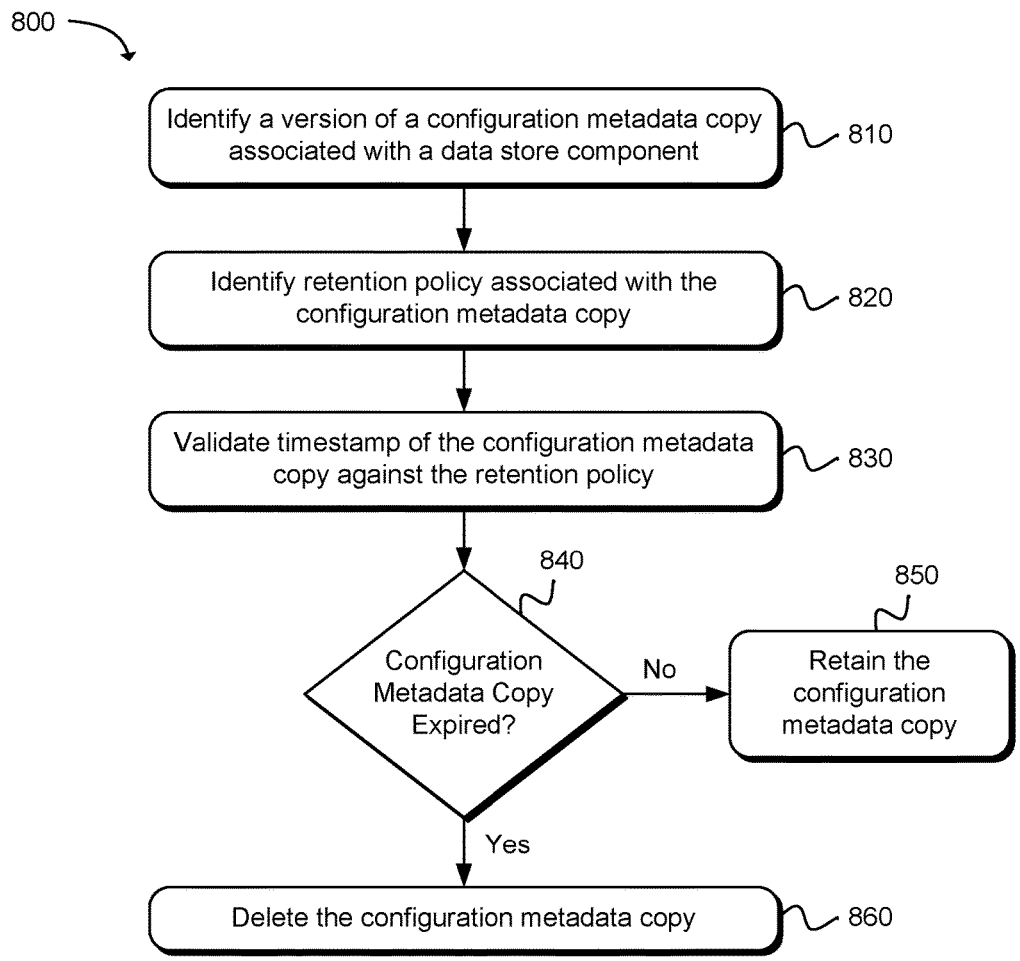
FIG. 8 is a flow diagram illustrating an example method for managing multiple versions of configuration metadata copies.

FIG. 8 is a flow diagram that illustrates an example method 800 for managing multiple versions of configuration metadata copies. Versioning of configuration metadata may result in storing multiple copies of configuration metadata that may accumulate over time. As time passes, the probability that a configuration metadata copy will be used to restore a configuration setting for a data store component decreases. Therefore, a management scheme may be used to manage versions of configuration metadata copies that are stored in a data store.

As part of the management scheme, a process may be configured to periodically search for expired versions of configuration metadata copies. In searching for expired configuration metadata copies, as in block 810, a version of a configuration metadata copy associated with a data store component may be identified and, as in block 820, a retention policy associated with the configuration metadata copy may be identified. The retention policy may specify a length of time that the configuration metadata copy may be retained in storage.

Having identified the retention policy associated with the configuration metadata copy, as in block 830, a timestamp of the configuration metadata copy may be validated against the retention policy. As in block 840, a determination may then be made whether the configuration metadata copy has expired. In the case that the configuration metadata copy has not expired, then as in block 850, the configuration metadata copy may be retained until the configuration metadata copy may be needed to perform a reversion operation, or until the configuration metadata copy expires. In the case that the configuration metadata copy has expired, then as in block 860, the configuration metadata copy may be deleted from storage.

Figure 9:
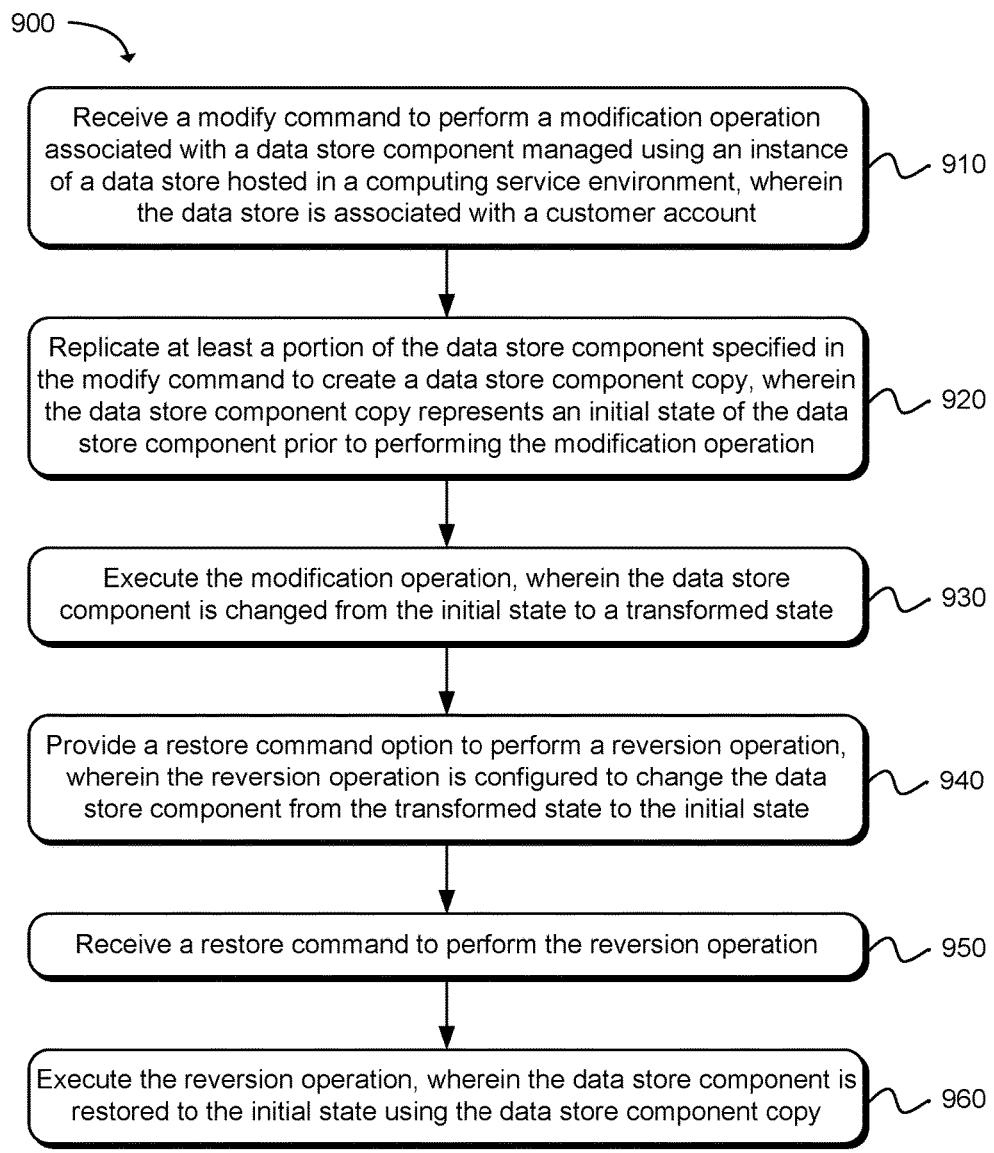
FIG. 9 is a flow diagram that illustrates an example method for restoring a data store component to an initial state.

FIG. 9 is a flow diagram illustrating an example method 900 for restoring a data store component to an initial state. Starting in block 910, a modify command may be received at a data store service. The modify command may request the performance of a modification operation associated with a data store component included in an instance of a data store hosted in a computing service environment, where the data store is associated with a customer account.

As in block 920, at least a portion of the data store component specified in the modify command may be replicated to create a data store component copy, where the data store component copy represents an initial state of the data store component prior to performing the modification operation. In some examples, a version identifier may be generated and may be assigned to the data store component copy. The data store component copy may then be stored for a time period that allows the reversion operation to be performed, and if the reversion operation is not performed within the time period, the data store component copy may be deleted after expiration of the time period.

After the data store component copy has been created, as in block 930, the modification operation may be executed, thereby changing the data store component from the initial state to a transformed state. In one example, the modification operation may perform a general data store operation, such a modifying, updating, copying, or moving a data container and/or an object. In another example, the modification operation may modify a configuration setting associated with a data store component, such as a data container and/or object.

As in block 940, a restore command option to perform a reversion operation may be provided, where the reversion operation may be configured to change the data store component from the transformed state to the initial state. Thereafter, as in block 950, a restore command to perform the reversion operation may be received at the data store service and, as in block 960, the reversion operation may be executed, thereby restoring the data store component to the initial state using the data store component copy.

Figure 10:
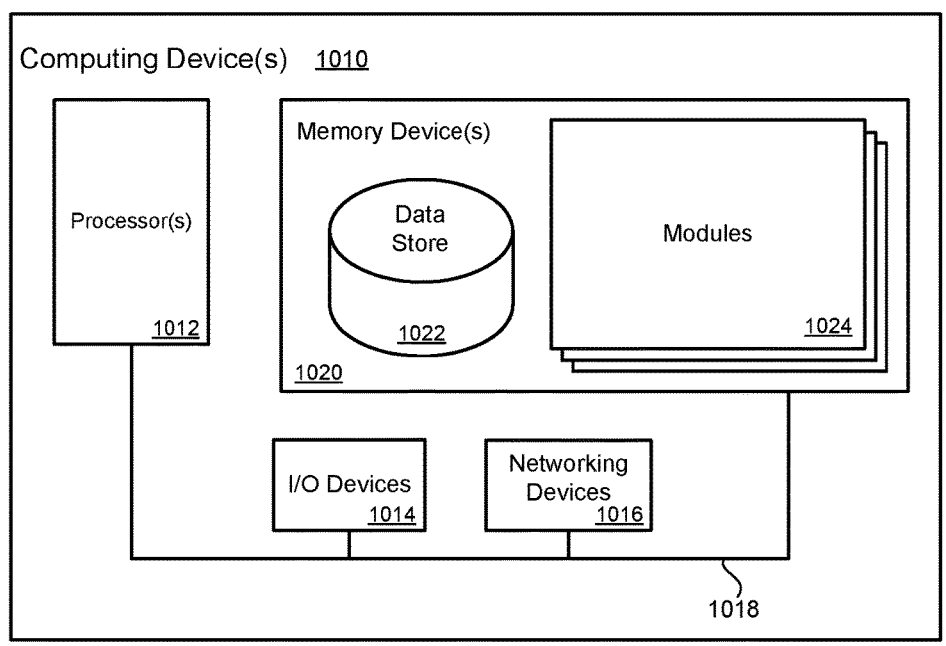
FIG. 10 is block diagram illustrating an example of a computing device that may be used to execute a method for restoring a data store component to an initial state using a reversion service.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. In one example, the memory device 1020 may include a replicating module, a restoring module, a version management module, and other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for restoring an object data store to an initial state, comprising:
  at least one processor;
  a memory device including instructions that, when executed by the at least one processor, cause the system to:
  receive a modify command to modify a configuration setting associated with a data store component of the object data store hosted in a computing service environment, wherein the object data store is associated with a customer account and the object data store is accessible via an object data store service managed by a service provider;
  replicate, in response to receiving the modify command, configuration metadata associated with the data store component to create a configuration metadata copy, wherein the configuration metadata includes the configuration setting for the data store component and the configuration metadata copy represents the initial state of the data store component;
  modify the configuration metadata according to the modify command to modify the configuration setting, wherein the data store component is changed from an initial state to a transformed state;

provide a restore command option to perform a reversion operation, wherein the reversion operation is configured to change the data store component from the transformed state to the initial state;

receive a restore command to perform the reversion operation; and execute the reversion operation, wherein the configuration metadata associated with the data store component is replaced with the configuration metadata copy to restore the configuration setting to the initial state.

2. A system as in claim 1, wherein the memory device includes instructions that, when executed by the processor, cause the system to assign a version identifier to the configuration metadata copy.

3. A system as in claim 1, wherein receiving the restore command further comprises:

receiving a version identifier for the configuration metadata copy; and retrieving the configuration metadata copy having the version identifier.

4. A system as in claim 1, wherein replacing the configuration metadata further comprises updating a key index with the configuration metadata copy, wherein the key index includes a key and the configuration metadata that is associated with the data store component stored in the object data store.

5. A computer implemented method, comprising:

receiving a modify command to perform a modification operation associated with a data store component managed using an instance of a data store service hosted in a computing service environment, wherein the data store service is associated with a customer account;

replicating, in response to receiving the modify command, at least a portion of the data store component specified in the modify command to create a data store component copy, wherein the data store component copy represents an initial state of the data store component prior to performing the modification operation;

executing the modification operation, wherein the data store component is changed from the initial state to a transformed state;

providing a restore command option to perform a reversion operation, wherein the reversion operation is configured to change the data store component from the transformed state to the initial state;

receiving a restore command to perform the reversion operation; and executing the reversion operation, wherein the data store component is restored to the initial state using the data store component copy.

6. A method as in claim 5, further comprising storing the data store component copy in a data store that contains the data store component for a time period that allows the reversion operation to be performed, wherein the data store component copy is deleted after expiration of the time period.

7. A method as in claim 5, further comprising generating a version identifier that is assigned to the data store component copy.

8. A method as in claim 5, wherein replicating the data store component further comprises:

replicating the data store component that is modified as part of executing the modification operation to create the data store component copy; and storing the data store component copy with a version identifier in the computing service environment.

9. A method as in claim 8, wherein the data store component includes customer data that is modified by the modification operation or the data store component itself is modified by the modification operation.

10. A method as in claim 5, wherein replicating the data store component further comprises replicating metadata that includes configuration settings for permissions and policies that are modified by the modification operation.

11. A method as in claim 5, wherein replicating the data store component further comprises:

replicating a data container that is modified as part of executing the modification operation to create a container copy that includes configuration information associated with the data container; and storing the container copy with a version identifier in the computing service environment.

12. A method as in claim 11, further comprising preserving indexing information that includes a data container name associated with the data container for a time period, allowing for the data container name to be reassigned to the data container as part of the reversion operation.

13. A method as in claim 5, further comprising updating a restore point log with a version identifier associated with the data store component copy creating a restore point, wherein the restore point log contains restore points associated with modification operations performed on data store components included in the data store service.

14. A method as in claim 5, wherein providing the restore command option further comprises:

identifying restore points associated with version identifiers for data store component copies; and providing a listing of the restore points from which a version of the data store component can be selected.

15. A method as in claim 5, further comprising limiting a number of data store component copies associated with the customer account that are stored in the computing service environment to a restore buffer limit.

16. A method as in claim 15, further comprising:

determining that the restore buffer limit has been exceeded;

identifying a stored data store component copy having an earliest time stamp; and removing the stored data store component copy from the computing service environment.

17. A method as in claim 5, further comprising providing reversion-limitation information that identifies aspects of the modification operation that cannot be undone by the reversion operation.

18. A non-transitory machine readable storage medium having instructions embodied thereon, wherein the instructions, when executed by a processor, cause the processor to:

receive a modify command to modify a configuration setting associated with a data store component of a data store hosted in a computing service environment;

replicate, in response to receiving the modify command, configuration metadata associated with the data store component to create a configuration metadata copy, wherein the configuration metadata includes the configuration setting for the data store component and the configuration metadata copy represents an initial state of the data store component;

assign a version identifier to the configuration metadata copy;

modify the configuration metadata according to the modify command to modify the configuration setting, wherein the data store component is changed from an initial state to a transformed state;

receive a restore command to perform a reversion operation, wherein the reversion operation is configured to change the data store component from the transformed state to the initial state, wherein the restore command includes the version identifier; and execute the reversion operation, wherein the configuration metadata copy assigned to the version identifier is used to restore the configuration setting to the initial state.

19. A non-transitory machine readable storage medium as in claim 18, wherein the instructions further cause the processor to provide a time period during which a restore command option is available.

20. A non-transitory machine readable storage medium as in claim 18, wherein the instructions further cause the processor to provide an estimated time frame for performing the reversion operation.

\* \* \* \* \*